United States Patent [19]

Schueller

[11] Patent Number: 4,726,222
[45] Date of Patent: Feb. 23, 1988

[54] CENTER OF GRAVITY FIXTURE

[75] Inventor: Gerald W. Schueller, Bloomington, Minn.

[73] Assignee: Honeywell Inc., Minneapolis, Minn.

[21] Appl. No.: 926,144

[22] Filed: Nov. 3, 1986

[51] Int. Cl.⁴ ............................................. G01M 1/12
[52] U.S. Cl. .................................................... 73/65
[58] Field of Search ............... 73/65, 66, 480, 481, 73/482, 487

[56]  References Cited

U.S. PATENT DOCUMENTS

| 2,103,811 | 12/1937 | Davis . | |
| 2,782,631 | 2/1957 | Baltrukonis et al. | 73/65 |
| 3,037,376 | 6/1962 | Grant . | |
| 3,191,429 | 6/1965 | Smith . | |
| 3,225,590 | 12/1965 | Ward et al. . | |
| 3,320,794 | 5/1967 | Monroe et al. | 73/65 |
| 3,375,045 | 3/1968 | Zeidler . | |
| 3,407,011 | 10/1968 | Zeidler . | |
| 4,407,154 | 10/1983 | Hardman et al. | 73/66 |

FOREIGN PATENT DOCUMENTS

| 387093 | 12/1923 | Fed. Rep. of Germany | 73/482 |
| 1120195 | 10/1984 | U.S.S.R. | 73/65 |

OTHER PUBLICATIONS

Vineberg, Abb. of Ser. No. 285,722, filed 6/5/63, published in O.G. 5/25/65, copy in 73/65.

Primary Examiner—Charles A. Ruehl
Attorney, Agent, or Firm—John G. Shudy, Jr.

[57]  ABSTRACT

A fixture for assisting in determining the location of a center of gravity of a torpedo, including a cradle suspended pendulously in a base or support. The cradle has a pair of rollers grooved to receive the torpedo, and provided with means for manually rotating the rollers to displace the torpedo axially until the cradle becomes level in the base when the location of the center of gravity may be observed or marked on the torpedo.

4 Claims, 5 Drawing Figures

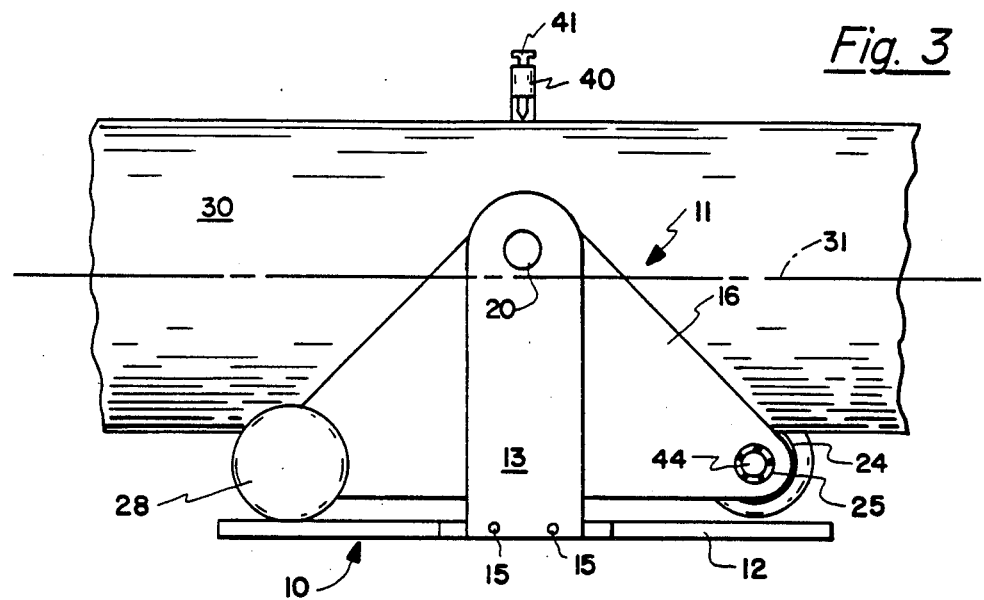
Fig. 3
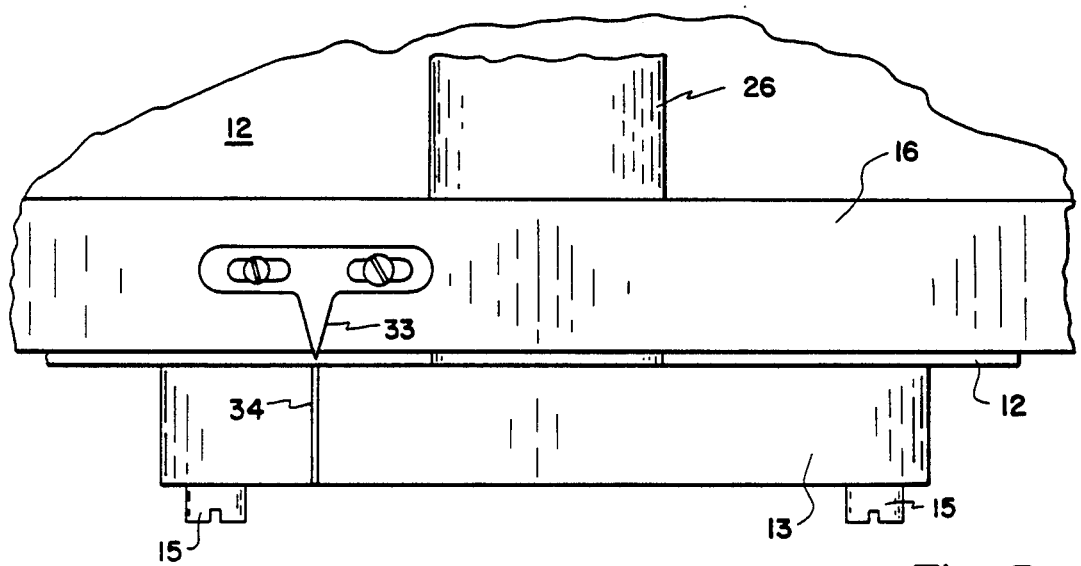
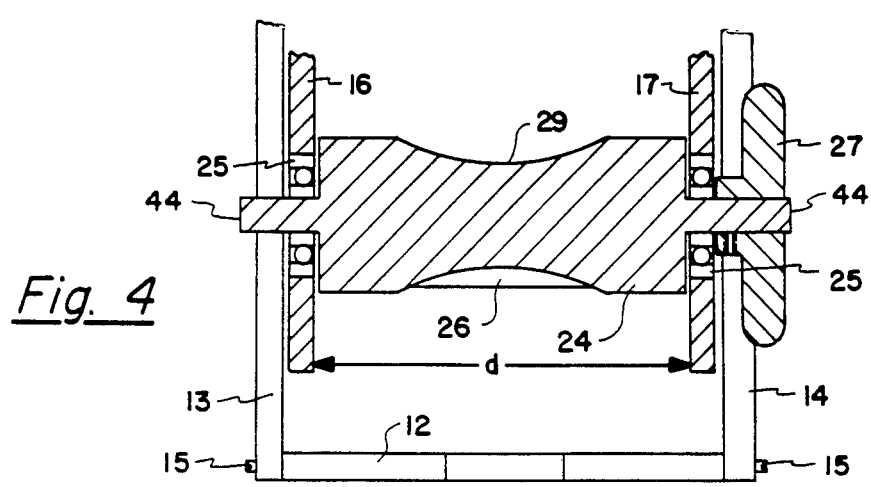
Fig. 5
Fig. 4

CENTER OF GRAVITY FIXTURE

This invention relates generally to the field of munitions, and particularly to an apparatus for use in inspection of marine torpedoes during and after manufacture.

BACKGROUND OF THE INVENTION

It has been found that a check on the longitudinal location of the transverse plane containing the center of gravity of an assembled torpedo is very informative as to whether the assembly steps in manufacturing the torpedo have been performed properly. If the center of gravity is not where it is expected, as may be indicated by a mark on the outside of the torpedo, there is a strong likelihood of manufacturing error. Also, air-launched torpedoes are supported in standard fashion in launching aircraft, and any mislocation of the center of gravity of so large a mass can have a significant effect on the flight of the aircraft. Furthermore, a mislocation of the center of gravity has an undesirable effect on the motion of the torpedo when in the water.

Accordingly, it is desirable to check assembled torpedoes to determine the locations of their centers of gravity. An apparatus for accomplishing this determination comprises the subject matter of the present invention.

Previous center of gravity arrangements such as those of U.S. Pat. Nos. 3,225,590 and 3,037,376 are known, but require awkward suspensions, repetitive weighings and complex computations, which are time consuming and subject to error; the present invention obviates these difficulties.

It is known that if an elongated body is supported at a site transversely aligned with its center of gravity, the body will balance, while if the support is not so aligned the body tips in a direction toward its center of gravity. The invention makes use of this principle by supporting the torpedo pendulously while enabling it to be moved axially until a point of balance is reached, so that the location of the center of gravity is thereby determined.

A typical torpedo is over a foot in diameter and eight feet long, and weighs seven or eight hundred pounds. Thus, it cannot be easily handled manually. According to the present invention, a torpedo is simply placed by a crane into a test fixture which thereafter does all manipulation of the torpedo necessary to the determination of in question.

Accordingly, it is an object of the invention to provide a fixture for pendulously receiving an elongated body such as a torpedo and facilitating its axial displacement to enable the determination of the axial location of the plane orthogonal to the body's longitudinal axis and containing the body's center of gravity.

Various features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing, FIG. 1 is a plan view of a fixture according to the invention, while FIG. 3 is a side view, suggesting the location of a torpedo in the fixture. FIG. 4 is a vertical section along the line 4—4 of FIG. 1, and FIG. 5 shows details of the level indicator.

DESCRIPTION OF THE PREFERRED EMBODIMENT

Figure 1:
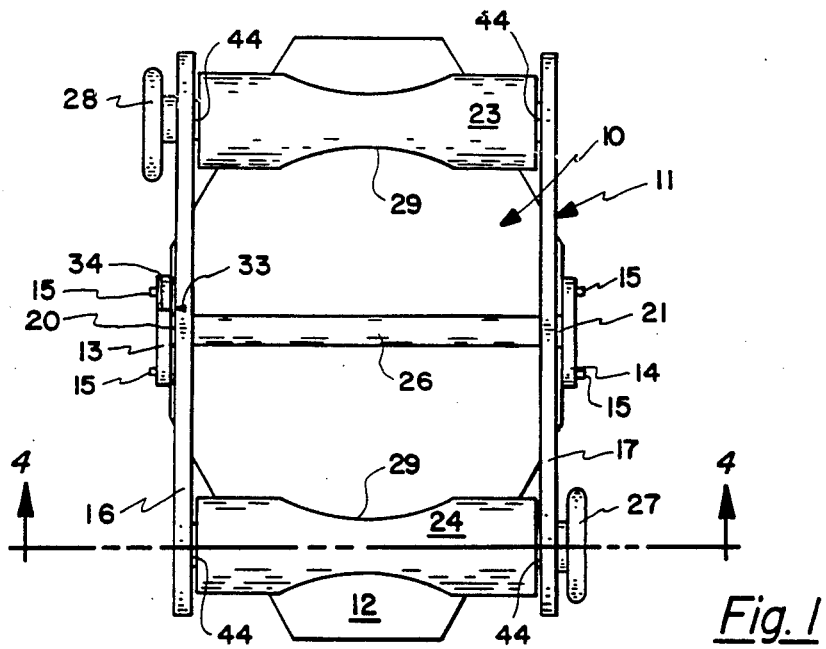
Figure 2:
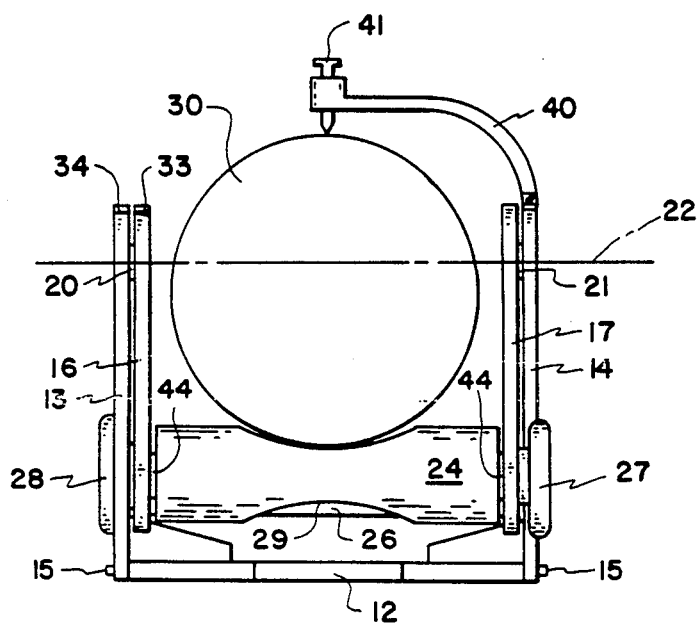
FIG. 2 is an end view.

As shown in the drawings, the fixture of the invention comprises a base 10 and a cradle 11. Base 10 includes a base plate 12 to which a pair of spaced supports 13 and 14 are attached as by bolts 15, to extend vertically therefrom. Base 10 and plate 12 are parallel to a horizontal plane orthogonal to the vector of the earth's gravitational force. Cradle 11 comprises a pair of triangular side plates 16 and 17 having transversely coaxial low-friction bearings 20 and 21 at the upper vertices of plates 16 and 17 by which they are pivotally connected to the tops of cradle supports 13 and 14, all respectively, so that cradle 11 is pendulously supported for rotation about the common transverse axis 22 of bearings 20 and 21.

Plates 16 and 17 of cradle 11 are laterally spaced by a distance "d" as noted in FIG. 4. Distance "d" is greater than the torpedo diameter. Plates 16 and 17 are interconnected by a pair of rollers 23 and 24 at their lower vertices carried in low-friction bearings 25, and also by an intermediate cross member 26. Bearings 25 are press fit onto shafts 44 of rollers 23 and 24 and into plates 16 and 17. The axes of the rollers 23 and 24 are substantially parallel to the axis 22 of bearings 20 and 21. Shaft 44 of roller 24 is extended beyond plate 17 to carry a knob 27 by which the roller may be manually rotated, in its low-friction bearings 25, and the shaft 44 of roller 23 extends beyond plate 16 to carry a siimilar but fixed knob 28 as a counter balance. Each roller, 23 and 24, is provided with a central, curved indentation or groove 29 onto which a torpedo 30 may be laid so that its longitudinal axis 31 extends orthogonally to the axes of rollers 23 and 24, and to the common axis 22 of bearings 20 and 21.

Cradle 11 is constructed to be pendulous about axis 22, whether empty or carrying a torpedo, and is arranged so that when the cradle is empty and base plate 12 is level, i.e., orthogonal to the vector of gravity, the axes of rollers 23 and 24 define a plane which is also level. Side plate 16 carries a pointer or index 33 which moves with respect to a mark or index 34 on support 13 to indicate any departure of cradle 11, i.e., the plane defined by the axes of rollers 23 and 24, from a level position. Pointer or index 33 may be moved relative to plate 16 for adjustment or calibration.

In order to correlate the use of the invention with the actual structure of a torpedo in the fixture, an arm 40 may be removably or pivotally secured to the top of support 14, to hold a sighting or marking device 41, which is used to align with a center of gravity indication on the torpedo or to make a center of gravity indication, when the torpedo 30 has been balanced.

In use, base 10 is placed on any surface; at this point, index 33 is aligned with index 34 when cradle 11 is empty. Then the fixture is ready for use. Torpedo 30 is lowered by a crane into the cradle 11 to rest on grooves 29 in rollers 23 and 24, and released. If the center of gravity to the torpedo 30 is then located in a vertical plane orthogonal to the longitudinal axis 31 and containing axis 22, cradle 11 will not tilt, as indicated at index 34. But ordinarily, to begin with, torpedo 30 causes cradle 11 to tilt in one direction or the other. Knob 27 is then manually operated to rotate roller 23 in a direction to move the torpedo 30 axially toward its higher end, the other roller also rotating under and supporting torpedo 30. As torpedo 30 moves, cradle 11 tilts toward its normal level position: when index 33 is aligned with index 34 indicating that the level position has been reached and the center of gravity of torpedo 30 is in the vertical plane containing axis 22.

If torpedo 30 carries a mark indicating the intended location of the center of gravity, this mark should now be in line with a sighting device at 41. If torpedo 39 does not carry such a mark, a marking device at 41 may be operated to place a suitable mark on the torpedo 30 surface.

In actual use of the apparatus it has been found that a linear movement of the torpedo along its longitudinal axis 31 by as little as twenty thousandths of an inch results in a perceptible tilting of the assembly of cradle 11 and torpedo 30. Thus, the arrangement is clearly very accurate.

A number of characteristics and advantages of the invention have been set forth in the foregoing description, together with details of the structure and function of the invention, and the novel features thereof are pointed out in the appended claims. The disclosure, however, is illustrative only, and changes may be made in details, especially in matters of shape, size, and arrangement of parts, within the principle of the invention, to the full extent indicated by the broad general meaning of the terms in which the appended claims are expressed.

The embodiment of the invention in which an exclusive property or right is claimed are defined as follows:

1. An apparatus for determining a center of gravity of an elongated body, comprising:

cradle means for pendulously supporting said body, comprising a roller means for receiving and supporting said elongated body, said body having rolling contact with said roller means; and base means for supporting said cradle means, comprising a frame means for pendulously supporting said cradle means about a pivotal axis; wherein said roller means comprises:

a first roller rotatable about an axis parallel to said pivotal axis; and a second roller rotatable about an axis parallel to said pivotal axis.

2. Apparatus of claim 1 wherein said first roller comprises a manually actuable means for rotating said first roller and in turn longitudinally moving said elongated body for said center of gravity determination.

3. Apparatus of claim 1 wherein said first roller has a varying diameter dimension, said dimension having a maximum magnitude toward each end of said roller and said dimension having a minimum magnitude equidistant from said ends, said roller having a shape conforming to a shape of said supported elongated body so that said body is stabilized in its position along an axis parallel to said pivotal axis.

4. Apparatus of claim 3 wherein said second roller has a varying diameter dimension, said dimension having a maximum magnitude toward each end of said roller and said dimension having a minimum magnitude equidistant from said ends, said roller having a shape conforming to a shape of said supported elongated body so that said body is stabilized in its position along an axis parallel to said pivotal axis.

* * * * *

UNITED STATES PATENT AND TRADEMARK OFFICE
CERTIFICATE OF CORRECTION

PATENT NO. : 4,726,222

DATED : February 23, 1988

INVENTOR(S) : GERALD W. SCHUELLER

It is certified that error appears in the above-identified patent and that said Letters Patent is hereby corrected as shown below:

Column 1, line 6, after "manufacture." insert --The Government has rights in this invention pursuant to Contract No. N00024-83-C-6254, awarded by the Department of the Navy.--

Signed and Sealed this

Sixteenth Day of August, 1988

Attest:

DONALD J. QUIGG

Attesting Officer

Commissioner of Patents and Trademarks